(12) United States Patent
Yang et al.

(10) Patent No.: US 10,868,901 B2
(45) Date of Patent: Dec. 15, 2020

(54) ELECTRONIC DEVICE PROVIDING CONTACT DESTINATION AND METHOD FOR OPERATING SAME

(71) Applicant: SAMSUNG ELECTRONICS CO., LTD., Suwon-si (KR)

(72) Inventors: Jong-Eun Yang, Seoul (KR); Hee-Jun Song, Seoul (KR)

(73) Assignee: SAMSUNG ELECTRONICS CO.. LTD., Suwon-si (KR)

( * ) Notice: Subject to any disclaimer, the term of this patent is extended or adjusted under 35 U.S.C. 154(b) by 0 days.

(21) Appl. No.: 16/077,311

(22) PCT Filed: Feb. 10, 2017

(86) PCT No.: PCT/KR2017/001446
§ 371 (c)(1),
(2) Date: Aug. 10, 2018

(87) PCT Pub. No.: WO2017/138758
PCT Pub. Date: Aug. 17, 2017

(65) Prior Publication Data
US 2019/0052742 A1 Feb. 14, 2019

(30) Foreign Application Priority Data

Feb. 11, 2016 (KR) ........................ 10-2016-0015819

(51) Int. Cl.
*H04M 3/42* (2006.01)
*H04M 1/2746* (2020.01)
(Continued)

(52) U.S. Cl.
CPC .......... *H04M 1/2746* (2020.01); *G06F 9/542* (2013.01); *H04M 1/27453* (2020.01);
(Continued)

(58) Field of Classification Search
CPC ........ H04L 29/08108; H04M 1/72519; H04M 3/56; H04M 3/42042; H04W 4/14; H04W 4/16
(Continued)

(56) References Cited

U.S. PATENT DOCUMENTS 6,614,895 B1 * 9/2003 Impey ................... H04M 1/575
379/127.01
7,873,157 B1 * 1/2011 Sim ..................... H04M 3/5232
379/265.01
(Continued)

FOREIGN PATENT DOCUMENTS

JP 2014-505948 A 3/2014
KR 10-2006-0042808 A 5/2006
(Continued)

OTHER PUBLICATIONS

Search Report dated May 15, 2017, issued by the International Searching Authority in International Application No. PCT/KR2017/001446 (PCT/ISA/210).
(Continued)

*Primary Examiner* — Matthew W Genack
(74) *Attorney, Agent, or Firm* — Sughrue Mion, PLLC

(57) ABSTRACT

An electronic device according to an embodiment of the present invention comprises: a communication module; an input module; a display, and a processor, wherein the processor may select at least one contact destination of a plurality of contact destinations on the basis of a response inputted through the input module for each of a plurality of events generated through the communication module, and display the same on the display.

15 Claims, 17 Drawing Sheets

(51) Int. Cl.
*H04M 1/725* (2006.01)
*G06F 9/54* (2006.01)
*H04M 1/27453* (2020.01)
*G06F 17/18* (2006.01)

(52) U.S. Cl.
CPC ... *H04M 1/72552* (2013.01); *H04M 1/72566* (2013.01); *H04M 1/72572* (2013.01); *H04M 1/72583* (2013.01); *G06F 17/18* (2013.01); *H04M 2250/10* (2013.01); *H04M 2250/60* (2013.01)

(58) Field of Classification Search
USPC ............... 455/414.1, 415–417, 466, 550.1
See application file for complete search history.

(56) References Cited

U.S. PATENT DOCUMENTS

| | | | |
|---|---|---|---|
| 8,862,108 B2 | 10/2014 | Lee et al. | |
| 9,319,525 B1* | 4/2016 | Noble, Jr. | H04M 3/5183 |
| 2008/0258913 A1* | 10/2008 | Busey | G08B 21/0415 |
| | | | 340/540 |
| 2009/0247137 A1* | 10/2009 | Awad | H04M 3/2227 |
| | | | 455/418 |
| 2011/0038471 A1 | 2/2011 | Gopalakrishna | |
| 2011/0131241 A1* | 6/2011 | Petrou | G06F 17/30861 |
| | | | 707/770 |
| 2011/0319061 A1* | 12/2011 | Schmackpfeffer | H04L 51/24 |
| | | | 455/415 |
| 2012/0191777 A1 | 7/2012 | Iwasaki et al. | |
| 2013/0115930 A1 | 5/2013 | Lee et al. | |
| 2015/0169664 A1 | 6/2015 | Roh | |
| 2016/0203290 A1* | 7/2016 | An | G06F 19/3456 |
| | | | 705/2 |
| 2017/0017908 A1* | 1/2017 | Bracher | G06Q 10/0635 |

FOREIGN PATENT DOCUMENTS

KR 10-2006-0088267 A 8/2006
KR 10-2014-0032161 A 3/2014

OTHER PUBLICATIONS

Written Opinion dated May 15, 2017, issued by the International Searching Authority in International Application No. PCT/KR2017/001446 (PCT/ISA/237).

* cited by examiner

ELECTRONIC DEVICE PROVIDING CONTACT DESTINATION AND METHOD FOR OPERATING SAME

CROSS-REFERENCE TO RELATED APPLICATION(S)

This application is a National Phase Entry of PCT International Application No. PCT/KR2017/001446, which was filed on Feb. 10, 2017, and claims priority to Korean Patent Application No. 10-2016-0015819, which was filed on Feb. 11, 2016, the contents of which are incorporated herein by reference.

BACKGROUND

1. Filed

The present disclosure relates to an electronic device that provides a contact partner, and an operation method of the electronic device.

2. Description of the Related Art

Since wireless communication technology and mobile devices have been developed, mobile devices that use this wireless communication technology have become utilized universally.

Most users who use mobile devices communicate with others via those mobile devices. Accordingly, various communication methods that use mobile devices exist, and the users of mobile devices can communicate with communication partners using these various communication methods.

In this instance, every time a user wants to communicate via a mobile device the user must search for a communication partner, which is inconvenient for the user. Additionally, since a user communicates with communication partners via various communication methods, the user needs to find a communication method that each communication partner prefers to use every time the user desires to communicate.

SUMMARY

According to aspects of the present disclosure, an electronic device and an operation method thereof, determine whether to make contact for each of the contact partners corresponding to transmit/receive events, and based on a user's response to the transmit/receive events that occur in the electronic device provide a contact partner selected based on the determined of making contact.

In accordance with an aspect of the present disclosure, an electronic device is provided, the electronic device includes: a communication module; an input module; a display; and a processor, wherein the processor is configured to select at least one contact partner from among a plurality of contact partners, based on a response input via the input module with respect to each of a plurality of events that occur via the communication module.

In accordance with an aspect of the present disclosure, an operation method of an electronic device is provided, the method including: detecting an event occurring via a communication module; receiving a response to the event via an input module; and selecting at least one of a plurality of contact partners, based on the response to the event, and displaying the at least one selected contact partner on a display.

According to an embodiment of the present disclosure, an electronic device selects a contact partner with a high probability that contact is made, based on the user's reaction to a transmitted/received event occurring in the electronic device, and provides the selected contact partner to the user.

Therefore, an electronic device, according to an embodiment of the present disclosure, provides a contact partner with a high probability that contact is made at a predetermined point in time, based on a response pattern of a user.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
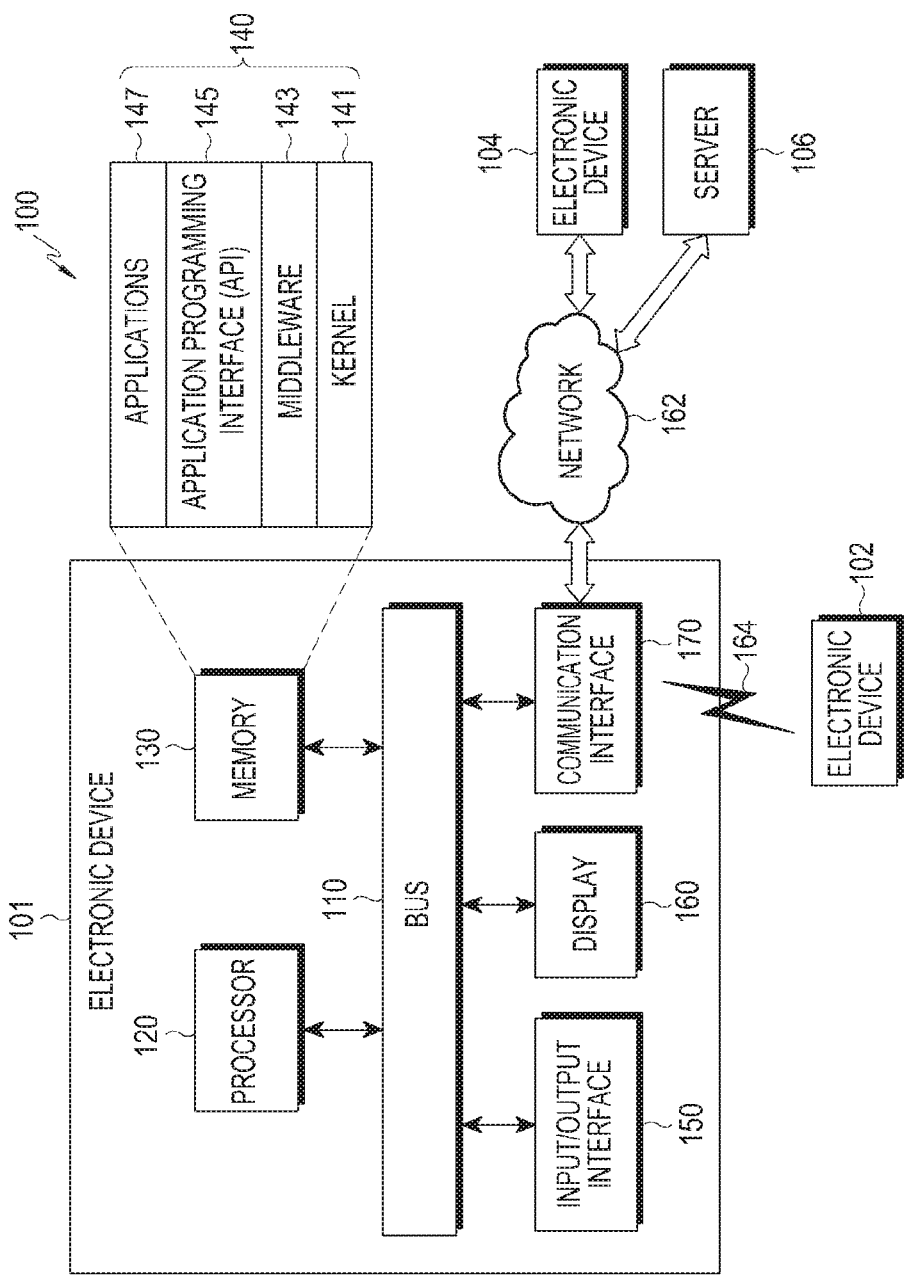
FIG. 1 is a block diagram illustrating an electronic device and a network according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments of the present disclosure will be described with reference to the accompanying drawings. In the present disclosure, the term "user" may indicate a person using an electronic device or a device (e.g., an artificial intelligence electronic device) using an electronic device.

An electronic device 101 in a network environment 100 according to various embodiments will be described with reference to FIG. 1. The electronic device 101 may include a bus 110, a processor 120, a memory 130, an input/output interface 150, a display 160, and a communication interface 170. In some embodiments, the electronic device 101 may omit at least one of the above elements or may further include other elements.

The bus 110 may include, for example, a circuit that interconnects the elements 110 to 170 and delivers communication (e.g., a control message and/or data) between the elements 110 to 170.

The processor 120 may include one or more of a central processing unit (CPU), an application processor (AP), and a communication processor (CP). The processor 120, for example, may carry out operations or data processing relating to the control and/or communication of at least one other element of the electronic device 101.

The memory 130 may include a volatile and/or non-volatile memory. The memory 130 may store, for example, instructions or data relevant to at least one other element of the electronic device 101. According to an embodiment, the memory 130 may store software and/or a program 140. For example, the program 140 may include a kernel 141, a middleware 143, an application programming interface (API) 145, and/or application programs (or applications) 147. At least some of the kernel 141, the middleware 143, and the API 145 may be referred to as an operating system (OS).

The kernel 141 may control or manage, for example, system resources (e.g., the bus 110, the processor 120, and the memory 130) which are used to execute an operation or a function implemented in the other programs (e.g., the middleware 143, the API 145, and the application programs 147). Furthermore, the kernel 141 may provide an interface via which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities to use the system resources (e.g., the bus 110, the processor 120, the memory 130, and the like) of the electronic device 101 to one or more of the application programs 147. For example, the middleware 143 may perform scheduling or loading balancing on the one or more task requests by processing the one or more task requests according to the priorities assigned to the one or more application programs.

The API 145, which is an interface via which the applications 147 control functions provided from the kernel 141 or the middleware 143, may include, for example, at least one interface or function (e.g., instruction) for file control, window control, image processing, text control, or the like.

The input/output interface 150 may function as, for example, an interface that can forward commands or data, which are input from a user or an external device, to the other element(s) of the electronic device 101. Furthermore, the input/output interface 150 may output commands or data, which are received from the other element(s) of the electronic device 101, to the user or the external device.

The display 160 may include, for example, a liquid crystal display (LCD), a light emitting diode (LED) display, an organic light emitting diode (OLED) display, a micro electro mechanical system (MEMS) display, or an electronic paper display. The display 160 may display, for example, various types of contents (e.g., text, images, videos, icons, symbols, and the like) for a user. The display 160 may include a touch screen and may receive, for example, a touch input, a gesture input, a proximity input, or a hovering input using an electronic pen or the user's body part.

The communication interface 170, for example, may set communication between the electronic device 101 and an external device (e.g., a first external electronic device 102, a second external electronic device 104, or a server 106). For example, the communication interface 170 may be connected to a network 162 via wireless or wired communication to communicate with the external device (e.g., the second external electronic device 104 or the server 106).

The wireless communication may use, for example, at least one of long term evolution (LTE), LTE-Advanced (LTE-A), code division multiple access (CDMA), wideband CDMA (WCDMA), universal mobile telecommunications system (UMTS), wireless broadband (WiBro), global system for mobile communications (GSM), and the like, as a cellular communication protocol. In addition, the wireless communication may include, for example, short range communication 164. The short range communication 164 may include at least one of, for example, Wi-Fi, Bluetooth, near field communication (NFC), global navigation satellite system (GNSS), and the like. The GNSS may include at least one of, for example, a global positioning system (GPS), a global navigation satellite system (Glonass), a Beidou navigation satellite system (hereinafter referred to as "Beidou"), and a European global satellite-based navigation system (Galileo), according to a use area, a bandwidth, or the like. Hereinafter, in the present disclosure, the "GPS" may be interchangeably used with the "GNSS". The wired communication may include, for example, at least one of a universal serial bus (USB), a high definition multimedia interface (HDMI), recommended standard 232 (RS-232), a plain old telephone service (POTS), and the like. The network 162 may include at least one of telecommunications networks such as a computer network (e.g., a LAN or a WAN), the Internet, and a telephone network.

Each of the first and second external electronic devices 102 and 104 may be of a type identical to, or different from, that of the electronic device 101. According to an embodiment, the server 106 may include a group of one or more servers. According to various embodiments, all or some of the operations executed by the electronic device 101 may be executed by another electronic device, a plurality of electronic devices (e.g., the electronic devices 102 and 104), or the server 106. According to an embodiment, when the electronic device 101 has to perform a function or service automatically or in response to a request, the electronic device 101 may request another device (e.g., the electronic device 102 or 104, or the server 106) to perform at least some functions relating thereto, instead of, or in addition to, performing the function or service. Another electronic device (e.g., the electronic device 102 or 104 or server 106) may execute the requested functions or the additional functions, and may deliver a result of the execution to the electronic device 101. The electronic device 101 may provide the received result as it is, or may additionally process the received result to provide the requested functions or services. To this end, for example, cloud computing, distributed computing, or client-server computing technology may be used.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware electronic device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

Figure 2:
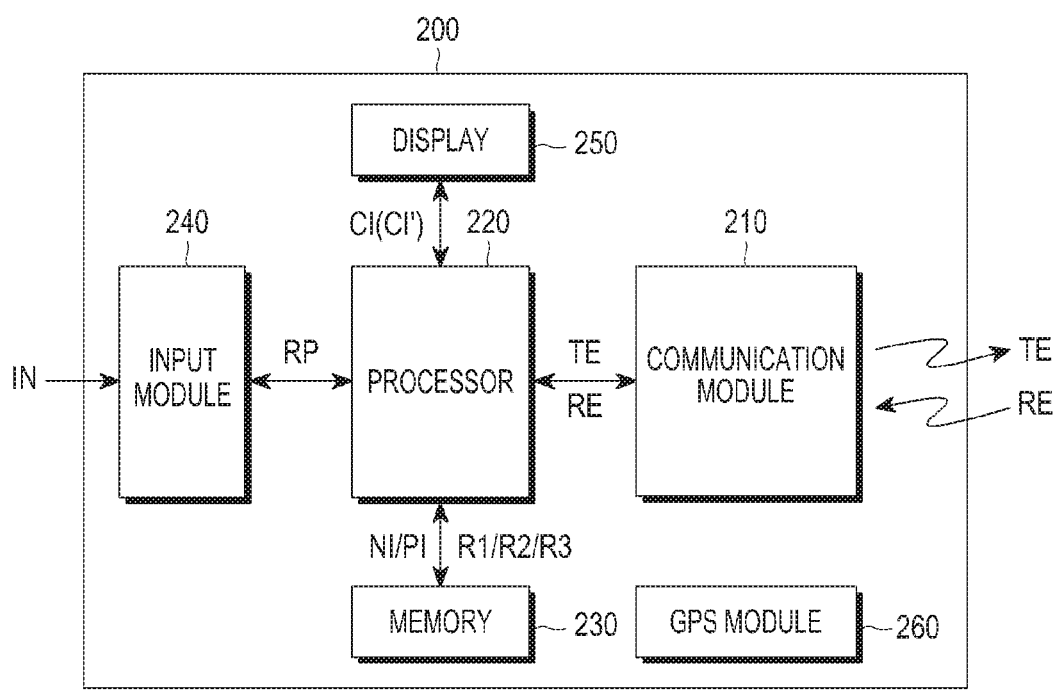
FIG. 2 is a block diagram schematically illustrating an electronic device according to various embodiments of the present disclosure.

FIG. 2 is a schematic block diagram illustrating an electronic device according to an embodiment of the present disclosure.

Referring to FIG. 2, the electronic device 200 may include a communication module 210, a processor 220, memory 230, an input module 240, a display 250, and a GPS module 260.

The electronic device 200 may be implemented to be substantially the same as, or similar to, the electronic device 101 of FIG. 1. For example, the electronic device 200 may be implemented as a device that is capable of performing a communication function with a mobile terminal, a portable terminal, a notebook, a PC, a smart phone, and/or other electronic devices, via wireless communication technology or wired communication technology.

The communication module 210 may generate an event according to the control of the processor 220. For example, the event may include a transmit event (TE) or a receive event (RE).

According to an embodiment, the communication module 210 may receive data from another electronic device, and may transmit data to another electronic device according to the control of the processor 220. That is, the communication module 210 may generate a receive event (RE), which receives data from another electronic device, and a transmit event (TE), which transmits data to another electronic device, according to the control of the processor 220.

For example, the communication module 210 may be implemented to be substantially the same as, or similar to, the communication interface 170 of FIG. 1.

For example, an event may indicate an operation or a state of performing a communication function with another electronic device using wireless communication technology or wired communication technology. The event may indicate an operation or state that occurs while using a phone call, a text message service (a short message service (SMS) or a multi-media message service (MMS)), an instant message (IM), and/or social network service (SNS).

For example, the transmit event (TE) indicates an operation or state in which the electronic device 200 transmits data to another electronic device. The receive event (RE) indicates an operation or state in which the electronic device 200 receives data from another electronic device.

The processor 220 may control the overall operation of the electronic device 200.

The processor 220 may analyze events occurring in the electronic device 200, and may select a contact partner (contact partner information (CI)) with a high probability that contact is made with a user, and a contact method (CI') corresponding to the contact partner. Also, the processor 220 may provide the selected contact partner (contact partner information (CI)) and the contact method (CI') to the user.

According to an embodiment, the processor 220 may detect an event (or the occurrence of an event) that performs a communication function with another electronic device using any of a plurality of applications corresponding to a phone call, a text message service, an instant message, and a social network service.

The processor 220 may select a contact partner (CI) based on an event occurrence pattern (PI) and a user's response (or reaction) (RP) to an event. Also, the processor 220 may select a contact method (CI') corresponding to the contact partner (CI), based on the event occurrence pattern and the user's response to an event.

According to an embodiment, the processor 220 may select at least one contact partner (CI) from among a plurality of contact partners, based on a response (RP) input via the input module 240 with respect to each of a plurality of events occurring via the communication module 210. Also, the processor 220 may display the selected contact partner (CI) on the display 250.

According to an embodiment, the processor 220 may determine a contact method (CI') corresponding to a contact partner (CI), based on a first application corresponding to a response (RE) from among a plurality of applications corresponding to a plurality of events. Also, the processor 220 may display the determined contact method (CI') on the display 250. In this instance, the processor 220 may display the contact partner (CI) and the contact method (CI') corresponding to the contact partner (CI) on the display 250 simultaneously or sequentially.

The processor 220 may determine a contact method (CI') corresponding to a contact partner (CI), based on an application corresponding to an event occurring in the electronic device 200. For example, when the response (RE) to a receive event (RE) is an instant message (e.g., the execution of an IM application), the processor 220 may determine that a contact method preferred by a contact partner corresponding to the receive event is instant messaging. Also, when the transmit event is a phone call (e.g., the execution of a phone call application), the processor 220 may determine that a contact method preferred by a contact partner corresponding to the transmit event is phone calls.

An event occurrence pattern may indicate an event occurrence frequency (or event occurrence ratio) and/or an event occurrence time.

According to an embodiment, the processor 220 may select a contact partner (CI) based on the occurrence frequency of a transmit event (TE) and/or a receive event (RE). That is, the processor 220 may select a contact partner with a high occurrence frequency of a transmit event (TE) and/or receive event (RE) from among a plurality of contact partners, as a contact partner with a high probability that contact is made. In this instance, the processor 220 may determine a probability of making contact for each of a plurality of contact partners, based on the occurrence frequency of a transmit event (TE) and/or receive event (RE) occurring during a predetermined period of time.

According to an embodiment, the processor 220 may select a contact partner based on the occurrence time at which a transmit event (TE) and/or a receive event (RE) occurs. That is, the processor 220 may select a contact partner for which a transmit event (TE) and/or receive event (RE) have recently occurred from among a plurality of contact partners, as a contact partner with a high probability that contact is made.

A response (RP) to an event indicates a user's reaction, or a signal which corresponds to a user's reaction, and is transmitted from the input module 240.

According to an embodiment, the processor 220 may select a contact partner (CI) based on a response (RP) to a receive event (RE). That is, the processor 220 may select a contact partner for which the number of user's responses (RPs) to a receive event (RE) is high from among a plurality of contact partners, as a contact partner with a high probability that contact is made.

A response (RP) to an event may include a "user's sending", a "user's check", or a "user's disregard" with respect to the event.

The "user's sending" may include an immediate response by the user to a receive event, or may include a sending operation. For example, when the receive event is a phone call, the "user's sending" may indicate the immediate reception (or call reception) of a call request (calling) transmitted from another electronic device. Also, the "user's sending" may indicate making a phone call associated with a call request by the user.

When the receive event is an instant message, "user's sending" may indicate replying to a message received from a contact partner (e.g., transmitting data).

The "user's check" may indicate an operation or state of checking the receive event by the user. For example, when the receive event is an instant message, "user's check" may indicate checking a message received from another electronic device (e.g., a state of simply checking the message without transmitting data as a response).

The "user's disregard" may indicate an operation or a state in which a user does not perform checking or sending with respect to the receive event. Also, "user's disregard" may indicate an operation or state in which the user disregards the receive event. For example, when the receive event is an instant message, "user's disregard" may indicate a state in which the user does not perform sending or checking with respect to a message received from another electronic device. Also, when the receive event is an instant message, "user's disregard" may indicate an operation or a state in which the user refuses to receive a message received from another electronic device.

According to an embodiment, the processor 220 may generate a pop-up window or a state indication which indicates that a receive event (RE) occurs or has occurred in response to the receive event (RE), and may display the pop-up window or the state indication on the display 250.

The processor 220 may generate response information (R1, R2, and R3), based on a response (RP) corresponding to an input (IN) provided by the user for the pop-up window or the state indication.

According to an embodiment, when a sending operation is performed with respect to a pop-up window or a state indication corresponding to a receive event (RE), the processor 220 may count the operation as the "user's sending" (R1) with respect to a contact partner corresponding to the receive event (RE). When a check operation is performed with respect to a pop-up window or a state indication corresponding to a receive event (RE), the processor 220 may count the operation as the "user's check" (R2) with respect to a contact partner corresponding to the receive event (RE). When neither a check operation nor a sending operation is performed with respect to a pop-up window or a state indication corresponding to a receive event (RE), the processor 220 may count the same as "user's disregard" (R3) with respect to a contact partner corresponding to the receive event (RE). Also, when a disregard operation is performed with respect to a pop-up window or a state indication corresponding to a receive event (RE), the processor 220 may count the same as "user's disregard" (R3) with respect to a contact partner corresponding to the receive event (RE).

According to an embodiment, the processor 220 may generate response information (R1, R2, and R3) with respect to each of a plurality of contact partners, based on a response (RP) by the user in response to a receive event (RE). In this instance, the response information may include information associated with whether a user's response (RP) to a receive event (RE) exists. For example, the response information may include information associated with whether the user performs sending (R1), checking (R2), or disregarding (R3) with respect to a receive event associated with each of the plurality of contact partners.

The processor 220 may determine the probability of making contact for each of a plurality of contact partners based on response information (R1, R2, and R3) associated with each of the plurality of contact partners.

According to an embodiment, the processor 220 may determine the probability of making contact with a contact partner based on the content included in a receive event (RE). For example, when a received message associated with a receive event (RE) includes text, the processor 220 analyzes the text and detects information associated with a contact partner from the text. In this instance, the processor 220 may determine whether the probability of making contact with a contact partner included in the text is high or low.

According to an embodiment, the processor 220 may obtain schedule information (PI) of the user, which is stored in the memory 230. The processor 220 may detect information associated with a contact partner, a contact place, and/or a contact time from the schedule information (PI). The processor 220 may determine the probability of making contact with a contact partner based on the contact partner, the contact place, and/or the contact time, which is detected from the schedule information (PI).

The processor 220 may obtain schedule information of the user from a server (not illustrated) or another electronic device (not illustrated).

The processor 220 may determine the probability of making contact for each of a plurality of contact partners. The processor 220 may select a contact partner (CI), based on the probability of making contact. Also, the processor 220 may determine a contact method (CI') that is preferred by each of a plurality of contact partners, based on an event occurrence pattern.

The memory 230 may store data related to the electronic device 200. For example, the memory 230 may be implemented to be substantially the same as, or similar to, the memory 130 of FIG. 1.

According to an embodiment, the memory 230 may store data (or information) related to a contact partner, according to the control of the processor 220. Also, the memory 230 may transmit the stored data (or information) related to a contact partner to the processor 220, according to the control of the processor 220. For example, the memory 230 may be implemented as non-volatile memory.

The memory 230 may store a plurality of applications executed by the electronic device 200. For example, the memory 230 may store a contact partner (or a contact number information) management application, a phone call application, a text message service Applications, an instant message application, and/or a social network service application.

The memory 230 may store schedule information (PI) of the user. In this instance, the schedule information (PI) may be schedule information (PI) that is stored using a schedule management application stored in the memory 230.

The memory 230 may store a plurality of contact partners and contact number information (NI) corresponding to the plurality of contact partners. Hereinafter, contact number information corresponding to a plurality of contact partners will be described as a concept included in the plurality of contact partners.

Contact number information (NI) corresponding to the plurality of contact partners may indicate information used for communicating with the plurality of contact partners. For example, the contact number information (NI) corresponding to the plurality of contact partners may include phone numbers, IDs, IP addresses, and/or email addresses.

The contact number information (NI) of the plurality of contact partners may be stored in the memory 230, or may be stored in a server (or a database of a server) or another electronic device that is connected to the electronic device 200. That is, the processor 220 may obtain the contact number information (NI) of the plurality of contact partners from the memory 230. Also, the processor 220 may obtain contact number information (NI) of the plurality of contact partners from a server or from other electronic devices.

According to an embodiment, the memory 230 may store information associated with the occurrence frequency, the occurrence time associated with an event occurring in the electronic device 200, and response information (R1, R2, and/or R3) related to a response by the user to an event, according to the control of the processor 220. Also, the memory 230 may store the probability of making contact for each of the plurality of contact partners, according to the control of the processor 220.

The input module 240 may receive input (IN) from the user. For example, the input module 240 may indicate a device or means that is capable of recognizing input (IN) provided from a user, such as a touch screen, a microphone, a keyboard, a touch pad, a voice recognition module, a fingerprint recognition module, a gesture recognition module, and the like. That is, the input (IN) from the user may be implemented as a touch, a gesture, a voice, a swipe, and/or a click on the input module 240.

The input module 240 may receive input (IN) from the user, and may transmit a response (RP) to an event to the processor 220.

When the input module 240 is implemented as a touch screen, the input module 240 may be implemented to be attached to the display 250.

The display 250 may display a contact partner (CI) and a contact method (CI') corresponding to the contact partner (CI), according to the control of the processor 220. For example, the memory 250 may be implemented to be substantially the same as, or similar to, the display 160 of FIG. 1.

The GPS module 260 may obtain position information of the electronic device 200 using a GPS signal. Also, the GPS module 260 may transmit the position information of the electronic device 200 to the processor 220.

The processor 220 may determine the position of the user (or the electronic device 200), based on the position information received from the GPS module 260.

The processor 220 may determine the probability of making contact with a contact partner, based on the position of the user (or the electronic device 200), and may select a contact partner based on the determined probability of making contact.

Figure 3:
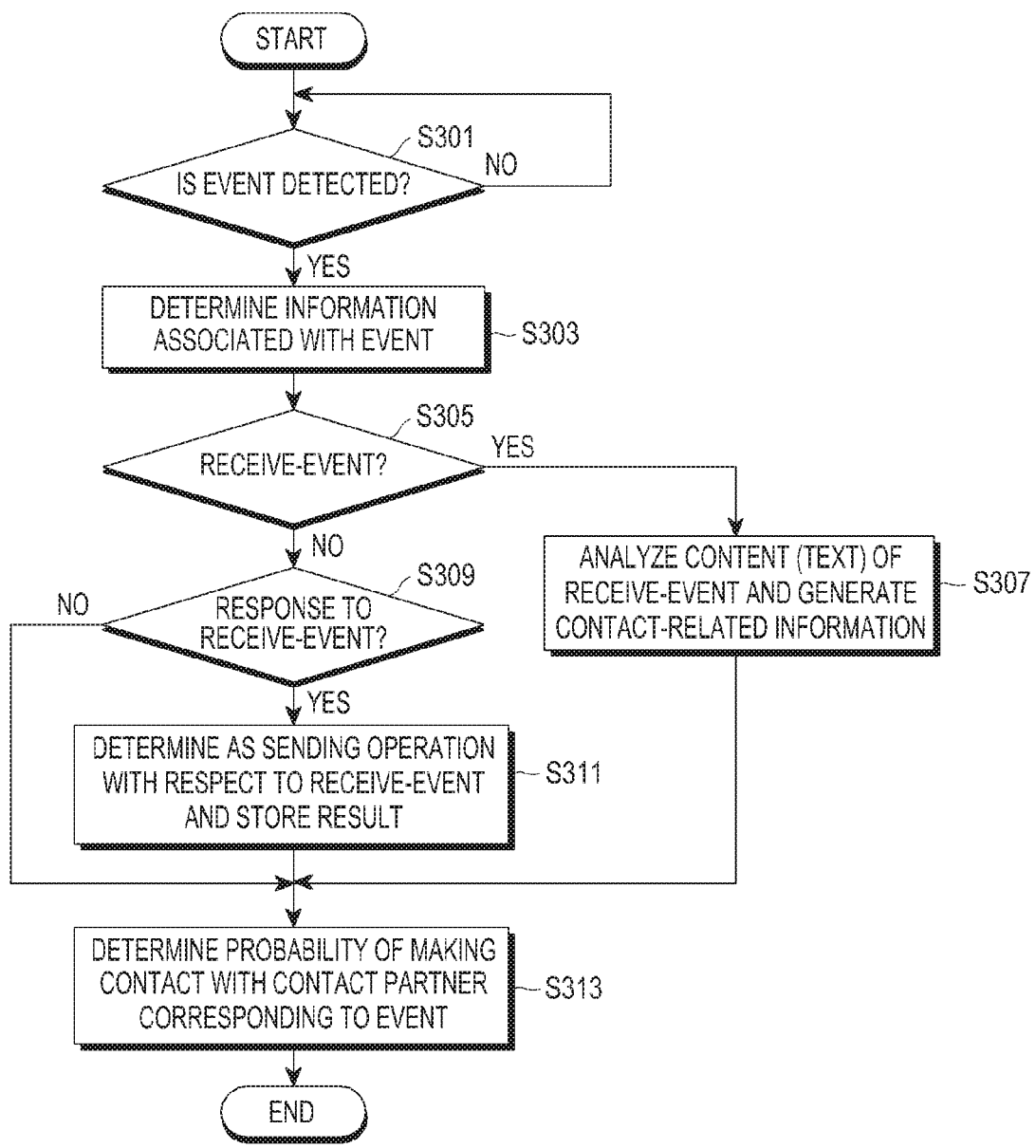
FIG. 3 is a flowchart illustrating an operation method of an electronic device according to various embodiments of the present disclosure.

FIG. 3 is a flowchart illustrating an operation method of the electronic device according to various embodiments of the present disclosure.

Referring to FIGS. 2 and 3, the processor 220 may detect an event (TE or RE) occurring in the electronic device 200 in operation S301.

When the event (TE or RE) is detected in operation S301 (YES), the processor 220 may determine information associated with the detected event in operation S303. In this instance, the information associated with the event may indicate the type of event, a contact partner associated with the event, and/or a contact method of the event. For example, the processor 220 may determine whether the event is a receive event or a transmit event, may determine who is a contact partner associated with the event, and may determine a contact method via which the event occurs.

When it is determined that the event is a receive event (RE) in operation S305 (YES), the processor 220 may analyze the content of the receive event (RE) in operation S307. For example, the processor 220 may analyze whether text included in the receive event (RE) includes information associated with a contact request.

Based on the contact request included in the receive event (RE), the processor 220 may determine whether the of making contact with a contact partner corresponding to the receive event (RE) is high or low in operation S313.

For example, when information associated with the contact request exists in the text included in the receive event (RE), the processor 220 may determine that the probability of making contact with the contact partner corresponding to the receive event (RE) is high. Also, when information associated with the contact request does not exist in the text included in the receive event (RE), the processor 220 may determine that the probability of making contact with the contact partner corresponding to the receive event (RE) is low.

When it is determined that the event is not a receive event (RE) in operation S 305 (NO), that is, when the event is a transmit event (TE), the processor 220 may determine whether the transmit event (TE) is a response (RP) to a receive event (RE) that previously occurred, in operation S309.

When the transmit event (TE) is not the response (RP) to the receive event (RE) that previously occurred in operation S309 (NO), the processor 220 may count the occurrence of a transmit event (TE) associated with a contact partner corresponding to the transmit event (TE). Also, the processor 220 may store count information associated with the contact partner corresponding to the transmit event (TE) in the memory 230.

The processor 220 may determine the probability of making contact with the contact partner corresponding to the transmit event (TE), based on whether a transmit event (TE) occurs, the occurrence frequency of a transmit event (TE), and/or the occurrence time at which a transmit event (TE) occurs, in operation S313.

When the transmit event (TE) is the response (RP) to the receive event (RE) that previously occurred in operation S309 (YES), the processor 220 may determine that the transmit event (TE) is a sending operation with respect to the contact partner corresponding to the receive event (RE). Also, the processor 220 may count the same as a sending operation with respect to the contact partner corresponding to the receive event (RE), and may store the count information in the memory 230 in operation S311.

The processor 220 may determine the probability of making contact with the contact partner corresponding to the event (TE or RE), based on a response by the user to the event (TE or RE) in operation S313. Also, the processor 220 may select a contact partner with a high probability that contact is made from among the plurality of contact partners, based on the determined probability of making contact.

Figure 4:
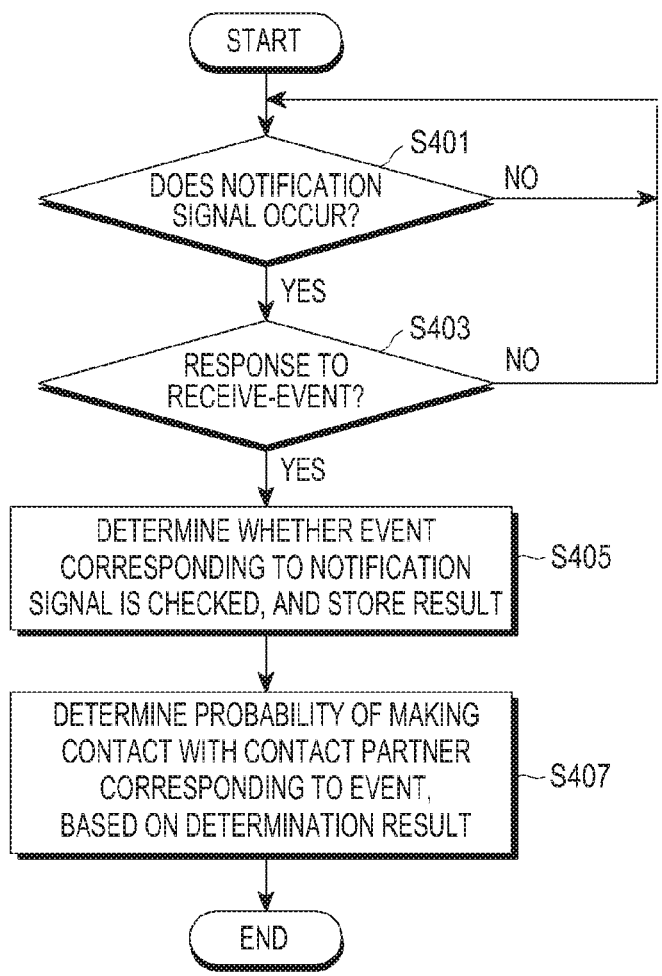
FIG. 4 is a flowchart illustrating an operation method of an electronic device according to various embodiments of the present disclosure.

FIG. 4 is a flowchart illustrating an operation method of an electronic device according to various embodiments of the present disclosure.

Referring to FIGS. 2 to 4, the processor 220 may generate a notification signal associated with a receive event (RE), and may provide the notification signal to a user in operation S401. For example, the processor 220 may display a pop-up window or a state indication corresponding to the notification signal on the display 250.

The processor 220 may determine whether a response exists with respect to the pop-up window or state indication corresponding to the notification signal in operation S403.

The processor 220 may determine whether the receive event (RE) is checked in operation S405. Also, the processor 220 may store whether the event with respect to a contact partner corresponding to the receive event (RE) is checked in operation S405. For example, when the receive event (RE) is checked, the processor 220 may count the same as a check operation associated with the contact partner corresponding to the receive event (RE).

The processor 220 may determine the probability of making contact with the contact partner corresponding to the receive event (RE), based on whether the receive event (RE) is checked, in operation S407. For example, when the receive event (RE) is checked, the processor 220 may determine that the probability of making contact with the corresponding contact partner is high. Also, when the receive event (RE) is not checked (e.g., disregard), the processor 220 may determine that the probability of making contact with the corresponding contact partner is low.

Figure 5:
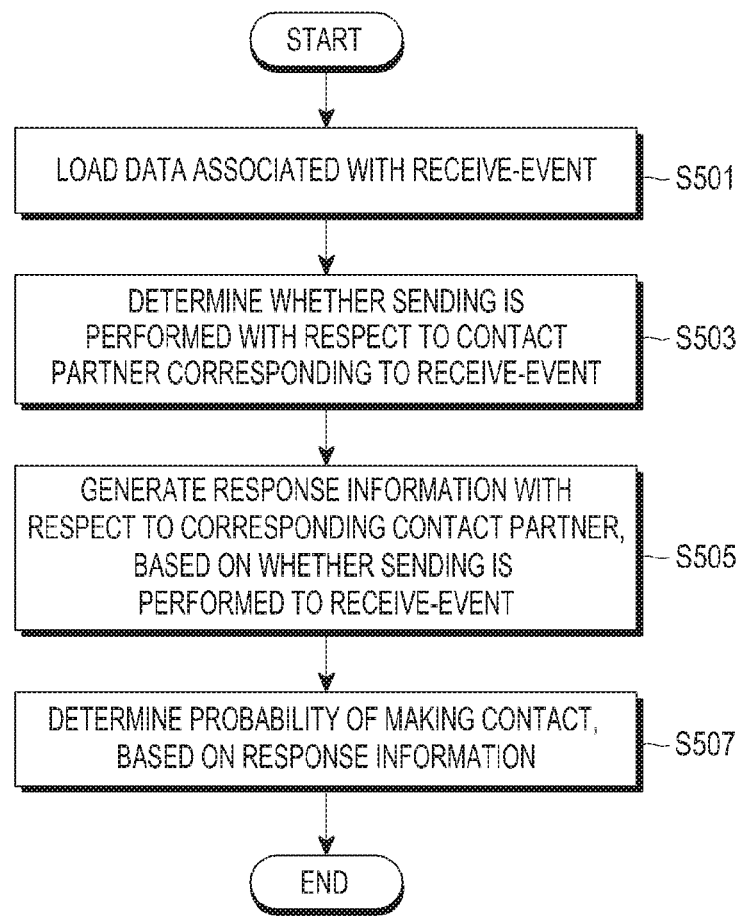
FIG. 5 is a flowchart illustrating an operation method of an electronic device according to various embodiments of the present disclosure.

FIG. 5 is a flowchart illustrating an operation method of an electronic device according to various embodiments of the present disclosure.

Referring to FIGS. 2 to 5, the processor 220 may load data associated with a receive event (RE) so as to select a contact partner in operation S501. For example, when a request from a user exists, the processor 220 may load data associated with a receive event (RE). In this instance, the request from the user may indicate a case in which the user executes an application in order to perform a communication function.

The processor 220 may determine whether a user's response exists with respect to a contact partner (or contact number information) corresponding to the receive event (RE) in operation S503. For example, the processor 220 may determine whether the user performs a sending operation with respect to the contact partner corresponding to the receive event (RE).

The processor 220 may generate response information (R1) to the contact partner (or contact number information), based on whether the user performs a sending operation with respect to the receive event (RE) in operation S505. In this instance, the response information (R1) may indicate information associated with whether the user performs a sending operation with respect to each of a plurality of contact partners corresponding to a plurality of receive events.

For example, the response information (R1) may include information associated with the user's sending (R1) with respect to the contact partner corresponding to the receive event (RE). That is, the response information (R1) may include information associated with the number of times that the user performs sending (R1) with respect to the contact partner corresponding to the receive event (RE).

The processor 220 may determine the probability of making contact for each of a plurality of contact partners, based on the response information (R1), in operation S507. Also, the processor 220 may select a contact partner with a high probability that contact is made, from among the plurality of contact partners, based on the determined probability of making contact.

Figure 6:
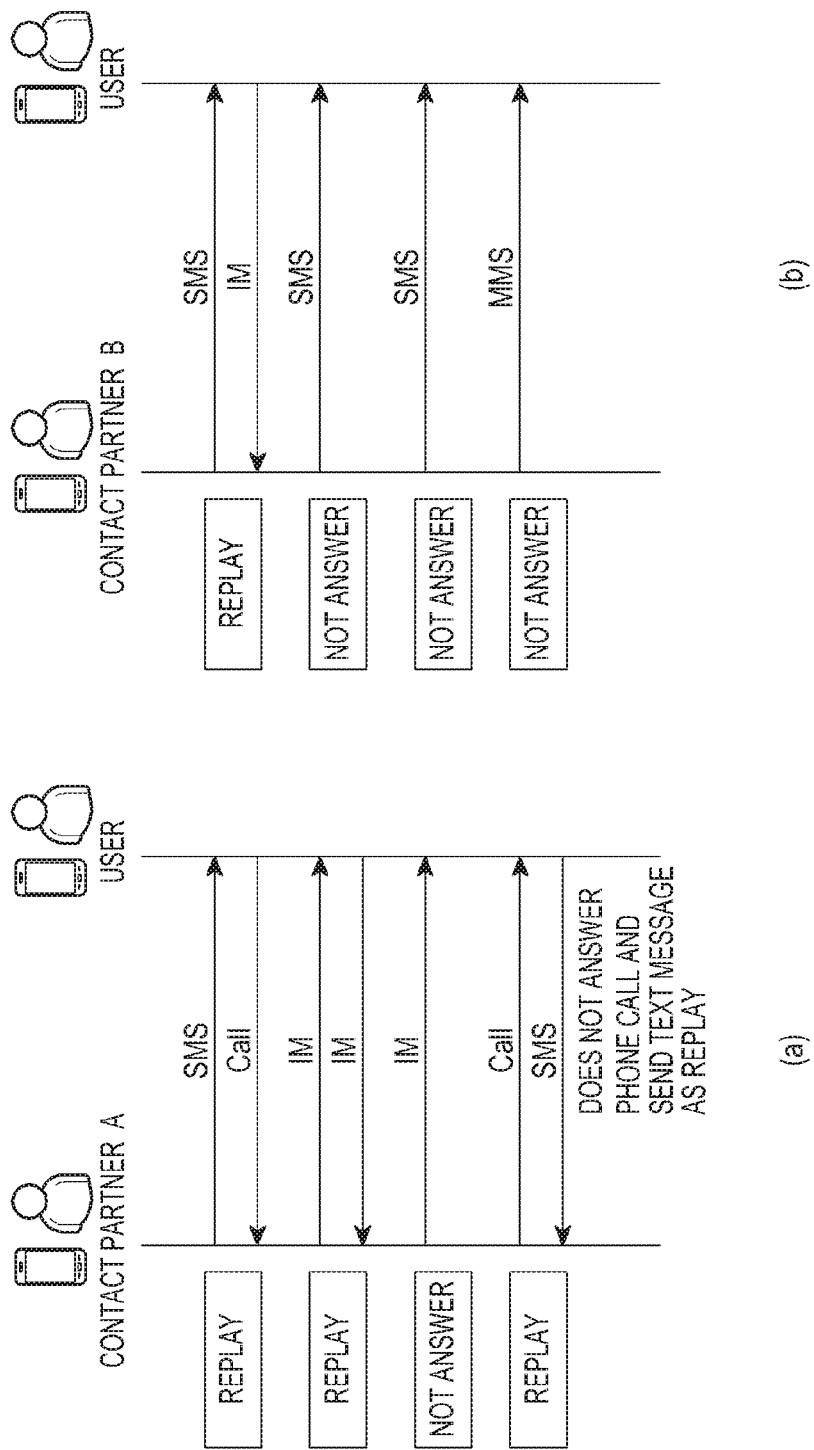
FIG. 6 is a block diagram illustrating a method of selecting a contact partner by an electronic device according to various embodiments of the present disclosure.

FIG. 6 is a block diagram illustrating a method of selecting a contact partner by an electronic device according to various embodiments of the present disclosure.

Referring to FIGS. 2 to 6, the processor 220 may determine the probability of making contact based on whether a response to a receive event (RE) exists.

Referring to FIG. 6(a), a user may receive data from a first contact partner (contact partner A) using the electronic device 200. For example, the electronic device 200 may receive text message information (SMS), an instant message (IM), and phone call reception information (CALL). Also, the user may transmit data using the electronic device 200 as a response (reply) to the receive event. For example, the user may transmit phone call transmission information (CALL), an instant message (IM), and text message information (SMS) using the electronic device 200.

The user may provide a response (or a reply) via a method different from the contact method corresponding to the receive event (RE). For example, the user may provide a text message as a reply to phone call reception information using the electronic device 200.

For example, the user may reply three times, and not reply once with respect to receive events associated with the first contact partner (contact partner A) using the electronic device 200.

Referring to FIG. 6(b), the user may receive a receive event (RE) from a second contact partner (contact partner B). For example, the electronic device 200 may receive text message information (SMS and MMS) from the second contact partner (contact partner B).

For example, the user may reply once, and not reply three times with respect to receive events associated with the second contact partner (contact partner B) using the electronic device 200.

According to an embodiment, the processor 220 replies three times with respect to 4 receive events associated with the first contact partner (contact partner A), and replies once with respect to 4 receive events associated with the second contact partner (contact partner B). In this instance, the number of replies with respect to the first contact partner (contact partner A) is higher than the other. The processor 220 may determine that the first contact partner (contact partner A) has a higher probability that contact is made than the second contact partner (contact partner B).

Therefore, the processor 220 may select, as a contact partner (CI), the first contact partner (contact partner A) from among the first contact partner (contact partner A) and the second contact partner (contact partner B).

Figure 7:
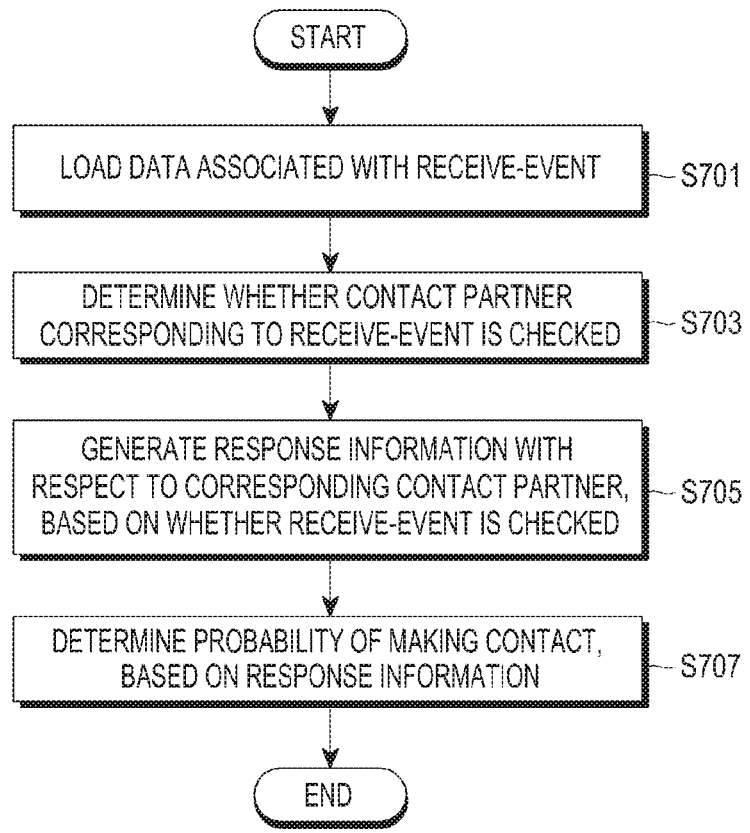
FIG. 7 is a flowchart illustrating an operation method of an electronic device according to various embodiments of the present disclosure.

FIG. 7 is a flowchart illustrating an operation method of an electronic device according to various embodiments of the present disclosure.

Referring to FIGS. 2 to 7, the processor 220 may load data associated with a receive event (RE) so as to select a contact partner in operation S701.

The processor 220 may determine whether a user checks a contact partner (or contact number information) corresponding to the receive event (RE) in operation S703. For example, the processor 220 may determine whether the user checks and/or disregards the contact partner corresponding to the receive event (RE).

The processor 220 may generate response information (R2 and R3) to the contact partner (or contact number information) based on whether the user checks (or disregards) the receive event (RE) in operation S705. In this instance, the response information (R2 and R3) may indicate information associated with whether the user checks or disregards each of a plurality of contact partners corresponding to a plurality of receive events.

For example, the response information (R2 and R3) may include information associated with user's check (R2) or disregard (R3) with respect to the contact partner corresponding to the receive event (RE). That is, the response information (R2 and R3) may include information associated with the number of times that user performs checking (R2) and/or disregarding (R3) with respect to the contact partner corresponding to the receive event (RE).

For example, when a user's check (R2) exists within a predetermined period of time, the processor 220 may count the same as a user's check (R2). Conversely, when a user's check (R2) does not exist within a predetermined period of time, the processor 220 may count the same as a user's disregard (R3). Also, when input (IN) indicating a user's disregard exists, the processor 220 may count the same as a user's disregard (R3).

The processor 220 may determine the probability of making contact for each of a plurality of contact partners based on the response information (R2 and R3), in operation S707. Also, the processor 220 may select a contact partner with a high probability that contact is made from among the plurality of contact partners, based on the determined probability of making contact.

Figure 8:
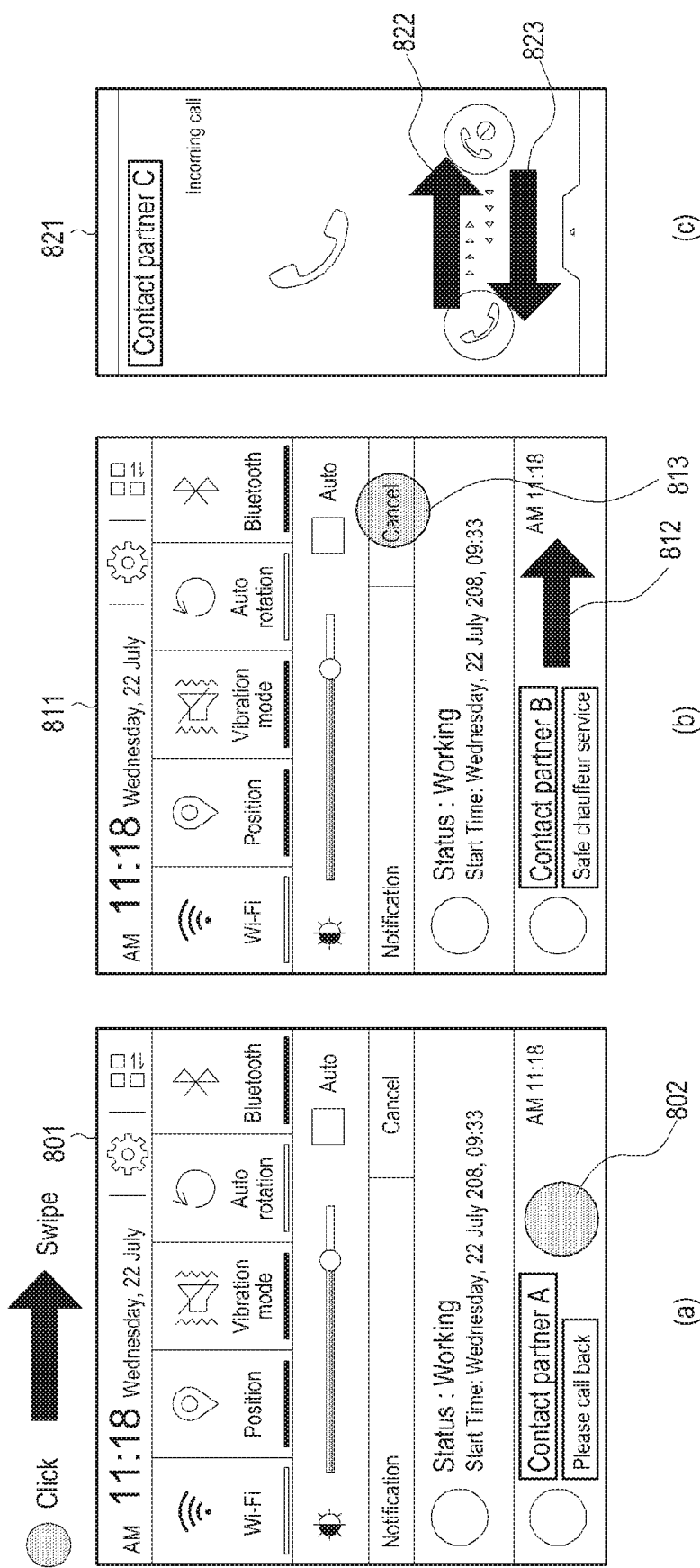
FIG. 8 is a block diagram illustrating a user's response to an electronic device according to various embodiments of the present disclosure.

FIG. 8 is a block diagram illustrating a user's response to an electronic device according to various embodiments of the present disclosure.

Referring to FIGS. 2 to 8, the processor 220 may select at least one contact partner, based on a response (RP) input via the input module 240. In this instance, the response (RP) input via the input module 240 may include a "user's sending", a "user's check", and a "user's disregard". The processor 220 may generate response information (R1, R2, and R3) which includes information associated with a "user's sending", a "user's check", and a "user's disregard".

FIG. 8(a) illustrates an operation of determining user's check by the processor 220 according to an embodiment of the present disclosure. Referring to FIG. 8(a), the processor 220 may provide a state indication 801 associated with a receive event (RE) of a first contact partner (contact partner A).

According to an embodiment, a user may perform clicking 802 on the state indication 801 associated with the first contact partner (contact partner A) via the input module 240. The processor 220 may determine that the user checks the first contact partner (contact partner A), in response to the clicking 802. Also, the processor 220 may count the number of times that the user checks the first contact partner (contact partner A).

FIG. 8(b) illustrates an operation of determining user's disregard by the processor 220 according to an embodiment of the present disclosure. Referring to FIG. 8(b), the processor 220 may provide a state indication 811 associated with a receive event (RE) of a second contact partner (contact partner B).

According to an embodiment, a user may perform swiping 812 the state indication 811 associated with the second contact partner (contact partner B) via the input module 240. The processor 220 may determine that the user disregards the second contact partner (contact partner B), in response to the swiping 812. Also, the processor 220 may count the number of times that the user disregards the second contact partner (contact partner B).

According to another embodiment, the user may perform clicking 813 on a state indication removal menu associated with the second contact partner (contact partner B) via the input module 240. The processor 220 may determine that the user disregards the second contact partner (contact partner B), in response to the clicking 813. Also, the processor 220 may count the number of times that the user disregards the second contact partner (contact partner B).

FIG. 8(c) illustrates an operation of determining a user's check by the processor 220 according to an embodiment of the present disclosure. Referring to FIG. 8(c), the processor 220 may provide a state indication 821 associated with a receive event (RE) of a third contact partner (contact partner C).

According to an embodiment, when a user receives a phone call request, the processor 220 may determine the same as user's sending. For example, the user may perform swiping 822 or 823 a state indication 821 associated with the third contact partner (contact partner C) via the input module 240. The processor 220 may determine the user's sending with respect to the third contact partner (contact partner C), in response to the first swiping 822. Also, the processor 220 may count the number of times that the user performs sending with respect to the third contact partner (contact partner C).

According to another embodiment, when the user rejects a phone call request, the processor 220 may determine the same as a user's disregard. For example, the processor 220 may determine the user's disregard associated with the third contact partner (contact partner C), in response to the second swiping 823. Also, the processor 220 may count the number of times that the user disregards the third contact partner (contact partner C).

When a missed call occurs, the processor 220 may defer determining a user's response (RP). For example, when the missed call occurs and the user's sending occurs, the processor 220 may determine the same as a user's sending. Also, when the missed call is checked, the processor 220 may determine the same as a user's check. However, when a user's check does not exist within a predetermined period of time after the missed call occurs, the processor 220 may determine the same as a user's disregard.

Figure 9:
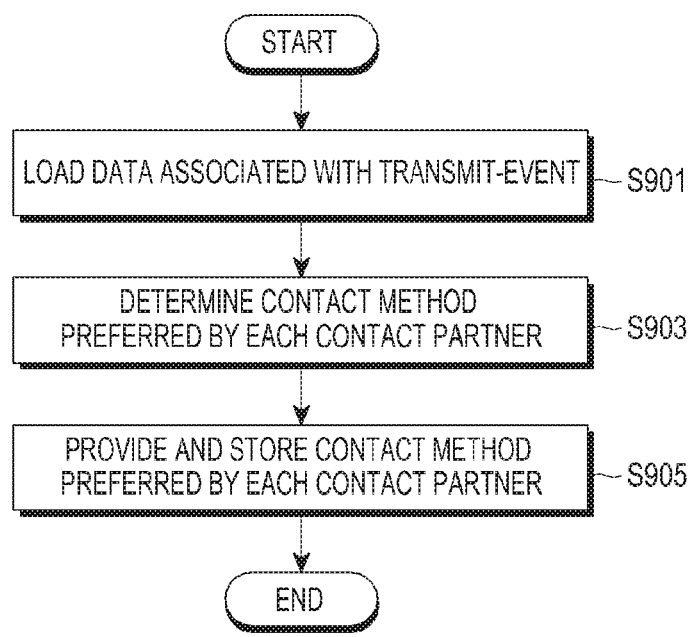
FIG. 9 is a flowchart illustrating an operation method of an electronic device according to various embodiments of the present disclosure.

FIG. 9 is a flowchart illustrating an operation method of an electronic device according to various embodiments of the present disclosure.

Referring to FIGS. 2 to 9, the processor 220 may load data associated with a transmit event (TE) so as to select a contact partner in operation S901. For example, the processor 220 may load information associated with a plurality of contact partners corresponding to transmit events (TE).

The processor 220 may determine a contact method corresponding to each of a plurality of contact partners in operation S903. According to an embodiment, the processor 220 may determine the contact method that each of the plurality of contact partners prefers. For example, the processor 220 may determine a preferred contact method based on applications that the electronic device 200 executes, so as to transmit a transmit event to each of the plurality of contact partners. Also, the processor 220 may sequentially determine the contact methods that the plurality of contact partners prefers.

The processor 220 may provide the contact method preferred by each of the plurality of contact partners in operation S905. Also, the processor 220 may store the contact method preferred by each of the plurality of contact partners in the memory 230 in operation S905. For example, the processor 220 may select a contact partner based on the probability of making contact, and may display, on the display 250, the selected contact partner together with a contact method preferred by the contact partner.

Figure 10:
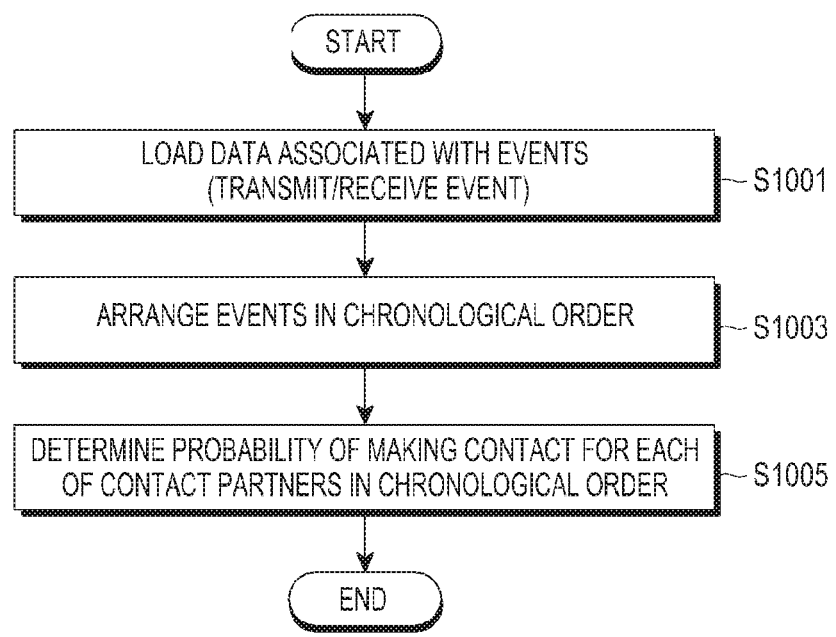
FIG. 10 is a flowchart illustrating an operation method of an electronic device according to various embodiments of the present disclosure.

FIG. 10 is a flowchart illustrating an operation method of an electronic device according to various embodiments of the present disclosure.

Referring to FIGS. 2 to 10, the processor 220 may load data associated with events from the memory 230 so as to select a contact partner in operation S1001. For example, events may indicate a transmit event (TE) and a receive event (RE).

The processor 220 may arrange the events (TE and RE) in chronological order. For example, the processor 220 may separately arrange receive events (RE) and transmit events, or may arrange the receive events (RE) and transmit events (TE) together without separation.

The processor 220 may determine the probability of making contact for each of a plurality of contact partners in chronological order in operation S1005. For example, the processor 220 may determine a contact partner with which recent contact was made as a contact partner with a high probability that contact is made. Also, the processor 220 may determine a contact partner with which contact was made long ago, as a contact partner with a low probability that contact is made.

However, the processor 220 may determine the probability of making contact, based on data associated with events accumulated within a predetermined period (or a predetermined period of time).

Figure 11:
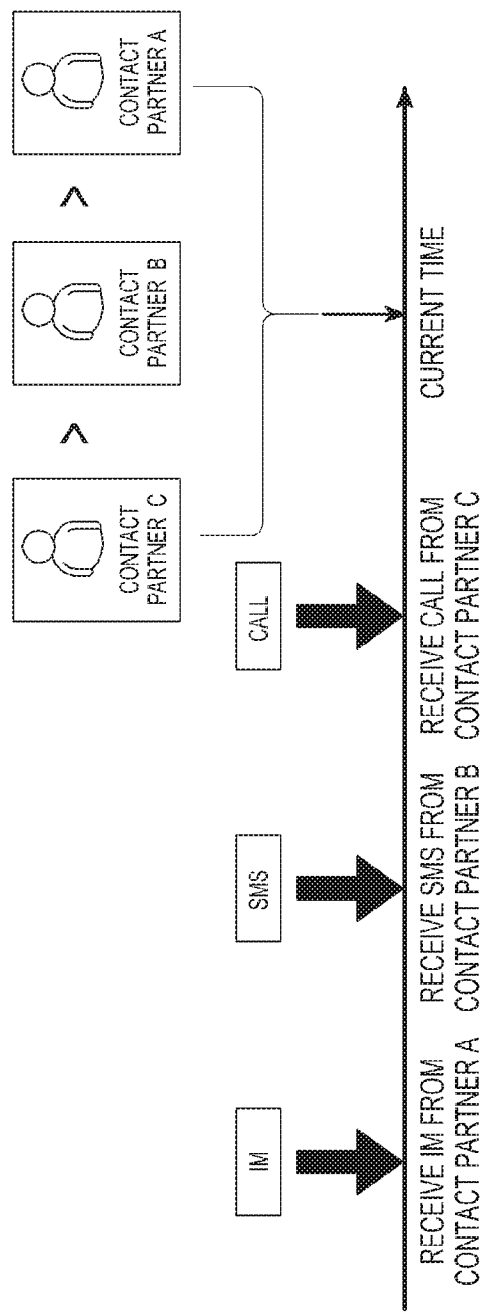
FIG. 11 is a block diagram illustrating a method of selecting a contact partner by an electronic device according to various embodiments of the present disclosure.

FIG. 11 is a block diagram illustrating a method of selecting a contact partner by an electronic device according to various embodiments of the present disclosure.

Referring to FIGS. 2 to 11, the processor 220 may determine the probability of making contact for each of a plurality of contact partners, based on an event occurrence time.

According to an embodiment, the processor 220 may determine the occurrence times of events. For example, the processor 220 may determine that the probability of making contact with a contact partner with a recent event occurrence time from among the plurality of contact partners is high.

According to an embodiment, the processor 220 may determine the probability of making contact for each of the plurality of contact partners, based on the occurrence time of a receive event. For example, a receive event associated with a first contact partner (contact partner A) occurs, and a receive event associated with a second contact partner (contact partner B) and a receive event associated with a third contact partner (contact partner C) occur sequentially.

Based on the current time, the processor 220 may determine that the probability of making contact with the third contact partner (contact partner C) is the highest, may determine that the probability of making contact with the second contact partner (contact partner B) is the second highest, and may determine that the probability of making contact with the first contact partner (contact partner A) is the lowest.

The processor 220 may select a contact partner, based on the probability of making contact. For example, the processor 220 may select the third contact partner (contact partner C) as a contact partner, based on the occurrence time of a receive event.

Figure 12:
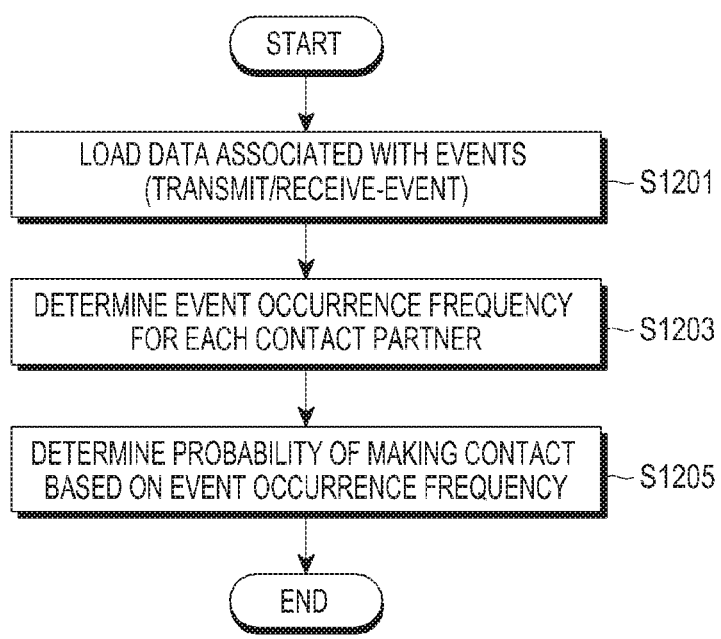
FIG. 12 is a flowchart illustrating an operation method of an electronic device according to various embodiments of the present disclosure.

FIG. 12 is a flowchart illustrating an operation method of an electronic device according to various embodiments of the present disclosure.

Referring to FIGS. 2 to 12, the processor 220 may load data associated with events from the memory 230 so as to select a contact partner in operation S1201. For example, events may indicate a transmit event (TE) and a receive event (RE).

The processor 220 may determine an event occurrence frequency for each of a plurality of contact partners in operation S1203. For example, the processor 220 may determine the occurrence frequency of a receive event (RE) and/or transmit event (TE) for each of the plurality of contact partners.

The processor 220 may determine the probability of making contact for each of a plurality of contact partners, based on the event occurrence frequency, in operation S1205. For example, the processor 220 may determine that the probability of making contact with a contact partner with a high event occurrence frequency from among the plurality of contact partners is high. Also, the processor 220 may determine that the probability of making contact with a contact partner with a low event occurrence frequency from among the plurality of contact partners is high.

The processor 220 may set a weight for the occurrence frequency of a transmit event (TE) and a weight for the occurrence frequency of a receive event (RE) to be the same or different from each other. For example, the processor 220 may determine that the probability of making contact with a contact partner with a high occurrence frequency of a transmit event (TE) is higher than the probability of making contact with a contact partner with a high occurrence frequency of a receive event (RE).

Figure 13:
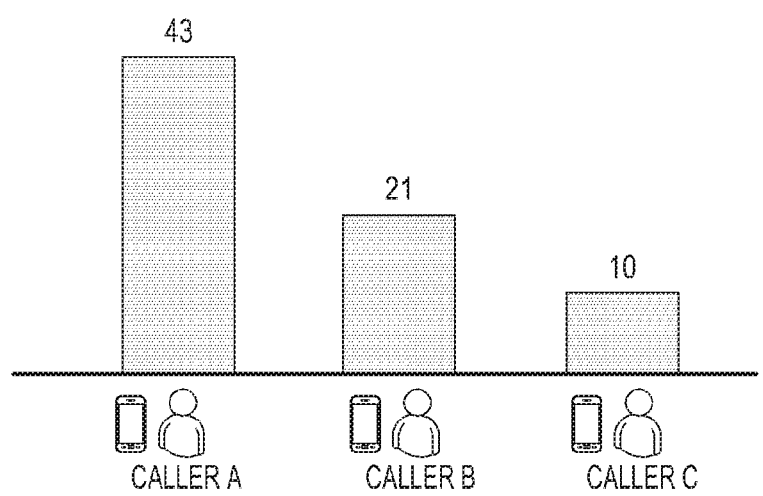
FIG. 13 is a block diagram illustrating a method of selecting a contact partner by an electronic device according to various embodiments of the present disclosure.

FIG. 13 is a block diagram illustrating a method of selecting a contact partner by an electronic device according to various embodiments of the present disclosure.

Referring to FIGS. 2 to 13, the processor 220 may determine the probability of making contact for each of a plurality of contact partners based on an event occurrence frequency.

According to an embodiment, the processor 220 may count the occurrence of an event. The processor 220 may determine an event occurrence frequency based on the count of the occurrence of an event. For example, the processor 220 may determine that the probability of making contact with a contact partner with a high event occurrence frequency from among the plurality of contact partners is high.

According to an embodiment, the processor 220 may determine the probability of making contact for each of the plurality of contact partners, based on the occurrence frequency of a transmit event. For example, the number of times that a transmit event associated with a first caller (caller A) occurs is 43, the number of times that a transmit event associated with a second caller (caller B) occurs is 21, and the number of times that a transmit event associated with a third caller (caller C) occurs is 10. The processor 220 may determine that the probability of making contact with the first caller (caller A) is the highest, may determine that the probability of making contact with the second caller (caller B) is the second highest, and may determine that the probability of making contact with the third caller (caller C) is the lowest.

The processor 220 may select a contact partner based on the probability of making contact. For example, the processor 220 may select the first caller (caller A) as a contact partner based on the occurrence frequency of a transmit event.

Figure 14:
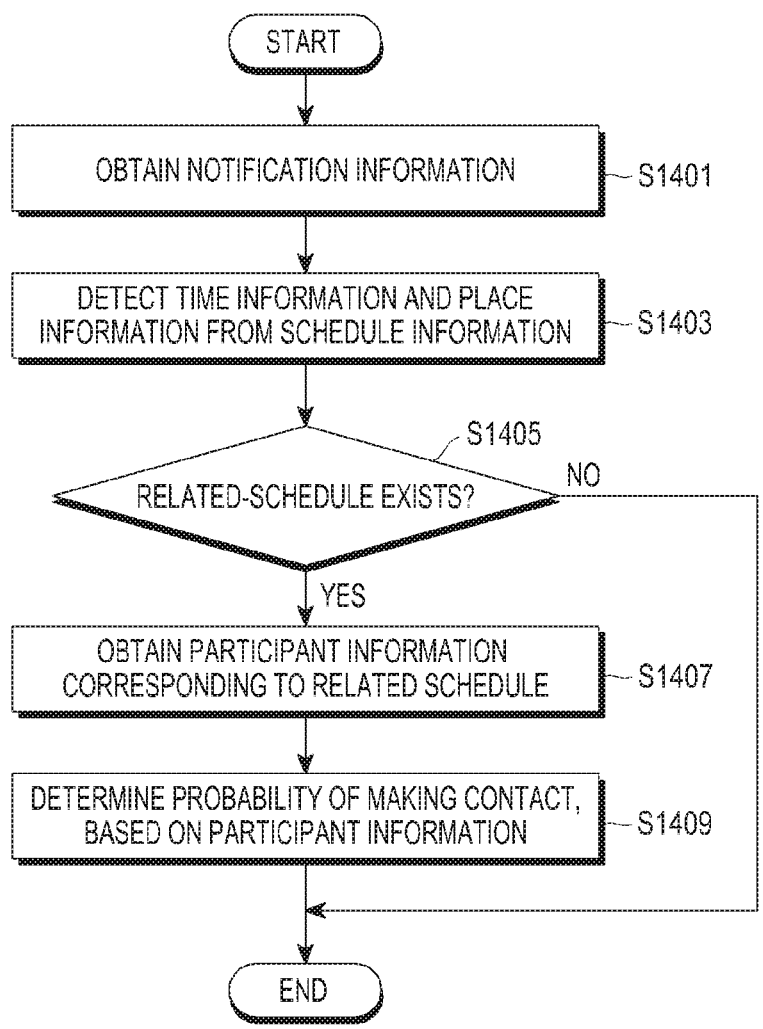
FIG. 14 is a flowchart illustrating an operation method of an electronic device according to various embodiments of the present disclosure.

FIG. 14 is a flowchart illustrating an operation method of an electronic device according to various embodiments of the present disclosure.

Referring to FIGS. 2 to 14, the processor 220 may obtain schedule information (PI) in operation S1401. For example, the processor 220 may obtain the schedule information (PI) from the memory 230. Also, the processor 220 may obtain the schedule information from a server (not illustrated) or another electronic device (not illustrated).

The processor 220 may detect time information or place information from the schedule information (PI) in operation S1403.

The processor 220 may determine whether a related schedule exists based on the time information and the place information detected from the schedule information (PI) in operation S1405. For example, the processor 220 may compare a currently executed schedule and the schedule information (PI) and may determine whether the related schedule exists. In this instance, the processor 220 may compare the current time with time information included in the schedule information (PI) and may determine the currently executed schedule.

When the related schedule exists, the processor 220 may obtain participant information corresponding to the related schedule in operation S1407. For example, the processor 220 may obtain the participant information from the currently executed schedule. Also, the processor 220 may obtain the participant information from the schedule information (PI).

The processor 220 may determine the probability of making contact with a contact partner based on the participant information in operation S1409. For example, the processor 220 may determine that the probability of making contact with a contact partner included in the participant information is high. Also, the processor 220 may determine that the probability of making contact with a contact partner that does not included in the participant information is low.

Figure 15:
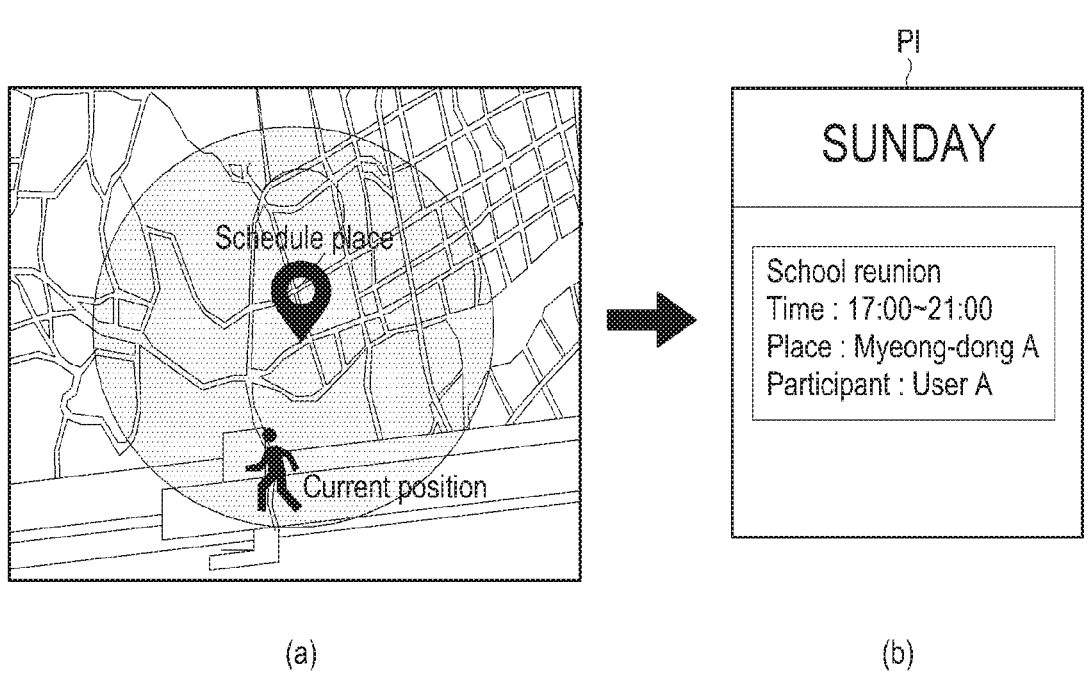
FIG. 15 is a block diagram illustrating a method of selecting a contact partner by an electronic device according to various embodiments of the present disclosure.

FIG. 15 is a block diagram illustrating a method of selecting a contact partner by an electronic device according to various embodiments of the present disclosure.

Referring to FIGS. 2 to 15, the processor 220 may obtain time information or place information from schedule information (PI).

The processor 220 may select a contact partner based on the time information and the place information obtained from the schedule information (PI). For example, the processor 220 may compare the obtained time information with the current time, and may determine the probability of making contact with the contact partner, based on a comparison result. Also, the processor 220 may compare the obtained place information with the current place (the location of the electronic device 200), and may determine the probability of making contact with the contact partner, based on a comparison result.

According to an embodiment, the processor 220 may obtain the time information (e.g., on Sunday at 17:00 to 21:00), the place information (e.g., Myeong-dong A), and participant information (USER A) from the schedule information (PI). In this instance, the processor 220 may determine a contact partner, based on the participant information (USER A).

The processor 220 may obtain the current place and the current time of the electronic device 200 from the GPS module 260. Also, the processor 220 may compare the place information (Myeong-dong A) and the current place of the electronic device 200 obtained from the GPS module 260. For example, when the place information (Myeong-dong A) and the current position are within a predetermined scope, the processor 220 may determine that the probability of making contact with the contact partner (USER A) is high. Also, when the current time is included in the time information (on Sunday at 17:00 to 21:00), the processor 220 determines that the probability of making contact with the contact partner (USER A) is high.

Figure 16:
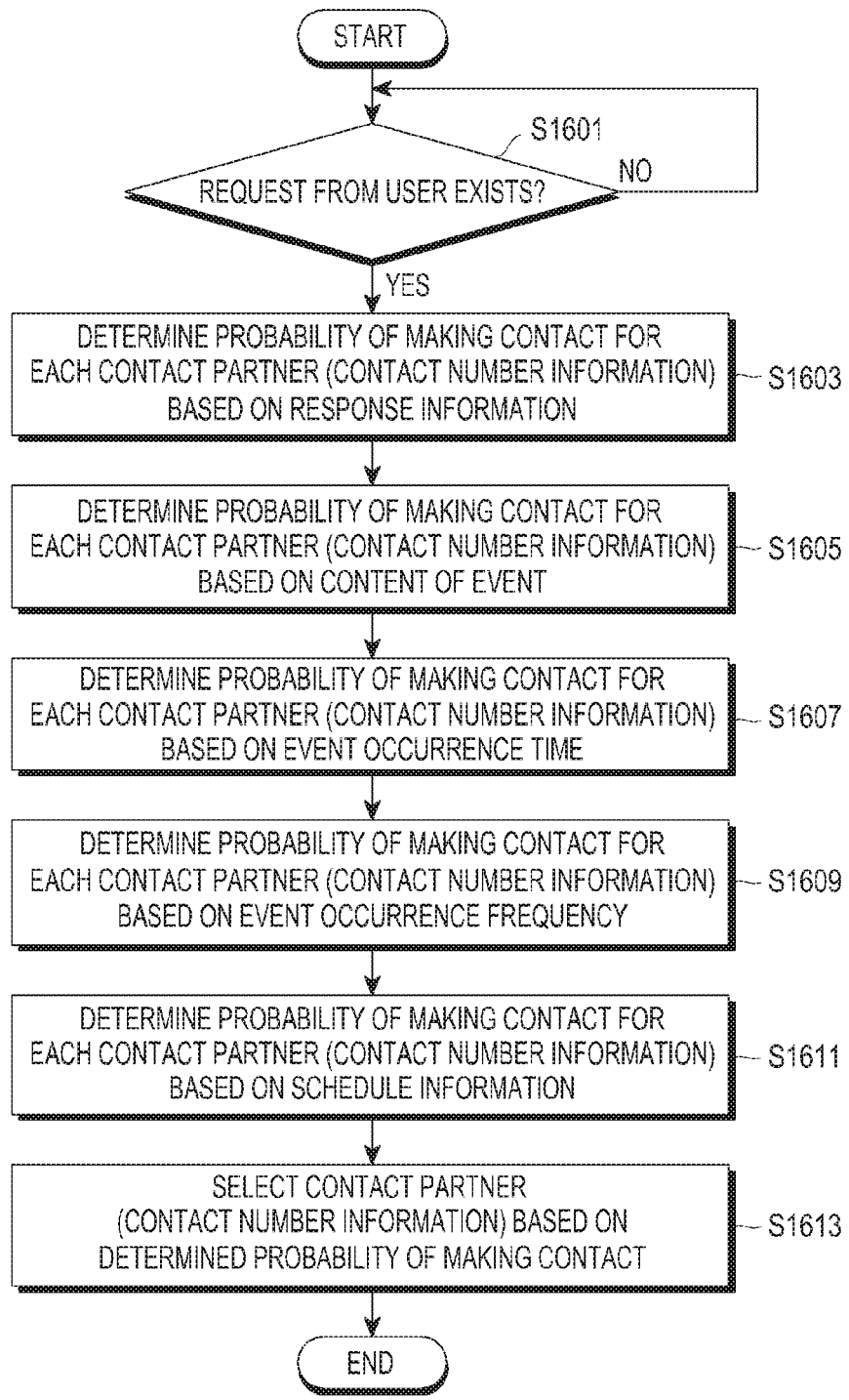
FIG. 16 is a flowchart illustrating an operation method of an electronic device according to various embodiments of the present disclosure.

FIG. 16 is a flowchart illustrating an operation method of an electronic device according to various embodiments of the present disclosure.

Referring to FIGS. 2 to 16, when a request from a user exists, the processor 220 may select a contact partner with a high probability that contact is made in operation S1601.

According to an embodiment, the processor 220 may detect the request from the user. For example, the request from the user may be the execution of an application that performs a communication function. Also, the request from the user may be the execution of a contacts application.

The processor 220 may determine the probability of making contact for each of a plurality of contact partners, in response to the request from the user.

The processor 220 may determine the probability of making contact for each of a plurality of contact partners based on response information (R1, R2, and R3), in operation S1603. For example, the processor 220 may determine the probability of making contact for each of the plurality of contact partners, based on the ratio of sending associated with events that occur. Also, the processor 220 may determine the probability of making contact for each of the plurality of contact partners, based on the ratio of checks associated with events that occur.

The processor 220 may determine the probability of making contact for each of the plurality of contact partners, based on the content included in an event, in operation S1605. That is, the processor 220 may determine the probability of making contact for each of the plurality of contact partners, based on text included in the event. For example, when the content associated with a contact request is included in the text from the receive event (RE), the processor 220 may determine that the probability of making contact with a contact partner corresponding to the receive event (RE) is high. Also, when spam-text is included in the text from the receive event (RE), the processor 220 may determine that the probability of making contact with the contact partner corresponding to the receive event (RE) is low.

The processor 220 may determine the probability of making contact for each of the plurality of contact partners, based on an event occurrence time, in operation S1607. For example, the processor 220 may determine that the probability of making contact with a contact partner corresponding to an event that recently occured is high. Also, the processor 220 may determine that the probability of making contact with a contact partner corresponding to an event that occurred long ago is low.

The processor 220 may determine the probability of making contact for each of the plurality of contact partners, based on an event occurrence frequency, in operation S1609. For example, the processor 220 may determine that the probability of making contact with a contact partner with a high event occurrence frequency is high. Also, the processor 220 may determine that the probability of making contact with a contact partner with a low event occurrence frequency is low.

The processor 220 may determine the probability of making contact for each of the plurality of contact partners, based on schedule information (PI), in operation S1611. For example, the processor 220 may determine the probability of making contact with a corresponding contact partner, based on a schedule place, a schedule time, and/or a schedule object included in the schedule information (PI). That is, as a result of analysis of the schedule information (PI), the processor 220 may determine that the probability of making contact with a contact partner that is related to the schedule is high.

In operation S1613, the processor 220 may select a contact partner based on the probability of making contact which is determined via operations S1603 to 1611. For example, the processor 220 may select a contact partner based on the probability of making contact, which is determined by at least one of operations S1603 to 1611.

The processor 220 may provide the selected contact partner to the user. For example, the processor 220 may provide the selected contact partner (CI) on the display 250.

Figure 17:
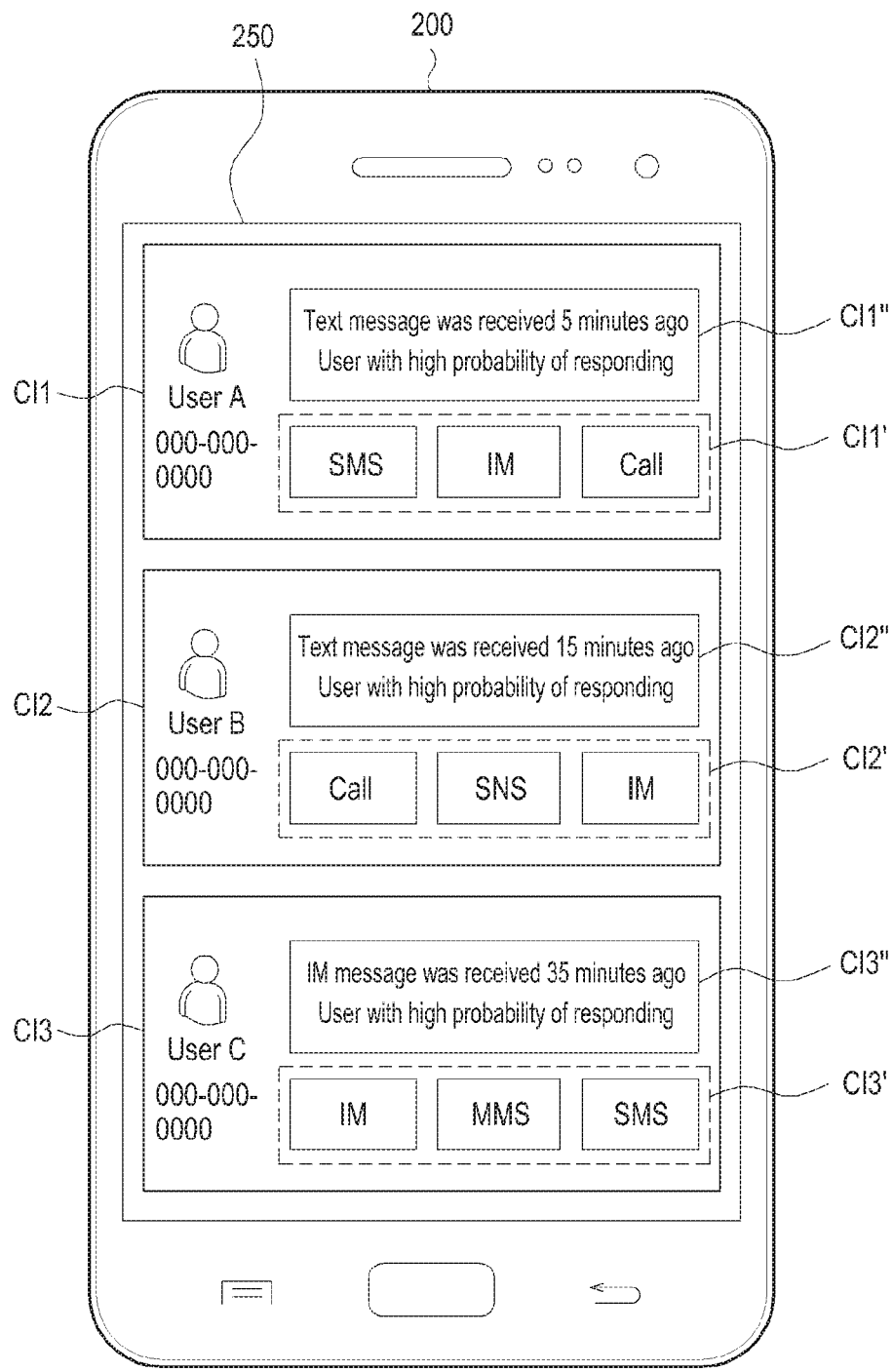
FIG. 17 is a diagram of a user interface illustrating a method in which an electronic device provides a contact partner according to various embodiments of the present disclosure.

FIG. 17 is a diagram of a user interface illustrating a method in which an electronic device provides a contact partner according to various embodiments of the present disclosure.

Referring to FIGS. 2 to 17, the processor 220 may select a contact partner (CI) based on the probability of making contact and may display the selected contact partner (CI) on the display 250.

According to an embodiment, the processor 220 may select at least one contact partner (CI1, CI2, and CI3). For example, the processor may select a first contact partner (CI1), a second contact partner (CI2), and a third contact partner (CI3), as contact partners. In this instance, the processor 220 may sequentially display the first contact partner (CI1), the second contact partner (CI2), and the third contact partner (CI3) on the display 250, based on the probability of making contact with each of the first contact partner (CI1), the second contact partner (CI2), and the third contact partner (CI3). For example, the first contact partner (CI1) may have the highest probability of making contact, the second contact partner (CI2) may have the second highest probability of making contact, and the third contact partner (CI3) may have the lowest probability of making contact.

According to an embodiment, the processor 220 may provide, via the display 250, a method of making contact with a contact partner. Also, the processor 220 may provide at least one contact method corresponding to the contact partner. In this instance, the processor 220 may provide at least one contact method in order of preference.

For example, the processor 220 may provide a first contact method (CI1') of the first contact partner (CI1), may provide a second contact method (CI2') of the second contact partner (CI2), and may provide a third contact method (CI3') of the third contact partner (CI3).

The first contact method (CI1') may provide a text message service (SMS), an instant message (IM), and a phone call (CALL). The second contact method (CI2') may provide a phone call (CALL), a social network service (SNS), and an instant message (IM). The third contact method (CI3') may provide an instant message (IM), a text message service (MMS), and a short message service (SMS).

For example, as the first contact method (CI1'), the processor 220 may provide a text message service (SMS), an instant message (IM), and a phone call (CALL) in order of preference.

According to an embodiment, the processor 220 may provide a contact partner together with a reason why the contact partner is selected. For example, when displaying the first contact partner (CI1) on the display 250, the processor 220 may provide a reason (CI1") why the first contact partner (CI1) is selected. That is, the processor 220 may provide "a text message was received 5 minutes ago" as the reason (CI1") why the first contact partner (CI1) is selected, may provide "a text message was received 15 minutes ago" as the reason (CI2") why the second contact partner (CI2) is selected, and may provide "an IM message is received 35 minutes ago" as the reason (CI3") why the third contact partner CI3 is selected.

Although FIG. 17 illustrates an interface via which the processor 220 provides only the first contact partner (CI1), the second contact partner (CI2), and the third contact partner (CI3) via the display 250, the technical idea of the present disclosure does not limit the number of contact partners and information included in a contact partner.

Each of the components of the electronic device according to the present disclosure may be implemented by one or more components and the name of the corresponding component may vary depending on a type of the electronic device. In various embodiments, the inspection apparatus may include at least one of the above-described elements. Some of the above-described elements may be omitted from the electronic device, or the inspection apparatus may further include additional elements. Further, some of the components of the electronic device according to the various embodiments of the present disclosure may be combined to form a single entity, and thus, may equivalently execute functions of the corresponding elements prior to the combination.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

The invention claimed is:

1. An electronic device, comprising:
a communication module;
a display; and
a processor configured to:
  detect an event in which the communication module is used;
  identify whether the event is an event for receiving a call or message from a contact partner;
  based on the event being for receiving the call or message, identify whether the call or message includes a contact request and identify a probability of making contact with the contact partner according to whether the call or message includes the contact request;
  based on the event not being for receiving the call or message, identify whether the event is for sending a call or message as a response to a previously received call or message;
  based on the event being for sending the call or message as the response to the previously received call or message, identify a probability of making contact for each of a plurality of contact partners stored in the electronic device based on a response record related to previously occurred events that are identical to the event for sending the call or message as the response; and
  provide, via the display, information on at least one contact partner corresponding to the event among the plurality of contact partners, based on the probability of making contact.

2. The electronic device of claim 1, wherein the processor is configured to identify a contact method for making contact with the at least one contact partner, based on a first application corresponding to the event.

3. The electronic device of claim 1, wherein the processor is configured to select the at least one contact partner, based on at least one of an event occurrence ratio and an event occurrence time associated with each of the plurality of contact partners.

4. The electronic device of claim 1, wherein the response record comprises a sending, a check, or a disregard with respect to the event.

5. The electronic device of claim 4, wherein the processor is configured to analyze a sending ratio of each of a transmitting event and a receiving event, and select the at least one contact partner, based on the sending ratio.

6. The electronic device of claim 4, wherein the processor is configured to analyze a check ratio of each of a transmitting event and a receiving event, and select the at least one contact partner, based on the check ratio.

7. The electronic device of claim 1, wherein the processor is configured to detect contact information from an event including text, and select the at least one contact partner, based on the contact information.

8. The electronic device of claim 1, wherein the processor is further configured to detect contact information from schedule information stored in the electronic device, and select the at least one contact partner, based on the contact information.

9. The electronic device of claim 8, further comprising:
a GPS module,
wherein the processor is configured to identify the probability of making contact, based on a position of the electronic device obtained from the GPS module and the contact information.

10. The electronic device of claim 1, wherein the event comprises a transmitting event and a receiving event which occur using at least one from among a text message service, a phone call, an instant message, and a social network service.

11. An operation method of an electronic device, comprising:
detecting an event in which a communication module of the electronic device is used;
identifying whether the event is an event for receiving a call or message from a contact partner;
based on the event being for receiving the call or message, identifying whether the call or message includes a contact request and identifying a probability of making contact with the contact partner according to whether the call or message includes the contact request;
based on the event not being for receiving the call or message, identifying whether the event is for sending a call or message as a response to a previously received call or message;
based on the event being for sending the call or message as the response to the previously received call or message, identifying a probability of making contact for each of a plurality of contact partners stored in the electronic device based on a response record related to previously occurred events that are identical to the event for sending the call or message as the response; and
providing, via a display of the electronic device, information on at least one contact partner corresponding to the event among the plurality of contact partners, based on the probability of making contact.

12. The method of claim 11, wherein the providing the at least one contact partner comprises:

identifying a contact method for making contact with the at least one contact partner, based on a first application corresponding to the event.

13. The method of claim 11, wherein the providing the at least one contact partner comprises:
    identifying the probability of making contact with each of the contact partners, based on at least one of an event occurrence ratio and an event occurrence time associated with each of the plurality of contact partners; and
    selecting the at least one contact partner, based on the probability of making contact.

14. The method of claim 11, wherein the response record comprises a sending, a check, or a disregard with respect to the event.

15. The method of claim 14, wherein the providing the at least one contact partner comprises:
    analyzing a sending ratio of the event, and identifying the probability of making contact with each of the plurality of contact partners based on the sending ratio; and
    selecting the at least one contact partner, based on the probability of making contact.

* * * * *